(12) United States Patent
Chen et al.

(10) Patent No.: US 9,650,494 B2
(45) Date of Patent: May 16, 2017

(54) POLYMER NANOCOMPOSITES AND METHODS OF MAKING NANOCOMPOSITES

(71) Applicants: King Abdullah University of Science and Technology (KAUST), Thuwal (SA); Saudi Aramco, Dhahran (SA)

(72) Inventors: Ye Chen, Thuwal (SA); Jing Tao, Thuwal (SA); Lin Deng, Thuwal (SA); Niveen Khashab, Thuwal (SA)

(73) Assignees: KING ABDULLAH UNIVERSITY OF SCIENCE AND TECHNOLOGY (SA); SAUDI ARABIAN OIL COMPANY (SA)

( * ) Notice: Subject to any disclaimer, the term of this patent is extended or adjusted under 35 U.S.C. 154(b) by 527 days.

(21) Appl. No.: 14/071,792

(22) Filed: Nov. 5, 2013

(65) Prior Publication Data
US 2014/0128519 A1     May 8, 2014

Related U.S. Application Data

(60) Provisional application No. 61/722,349, filed on Nov. 5, 2012.

(51) Int. Cl.
| | | |
|---|---|---|
| C08K 5/3445 | (2006.01) | |
| C08K 7/24 | (2006.01) | |
| C08J 3/20 | (2006.01) | |

(52) U.S. Cl.
CPC ............. *C08K 5/3445* (2013.01); *C08J 3/203* (2013.01); *C08K 7/24* (2013.01); *C08J 2379/08* (2013.01)

(58) Field of Classification Search
CPC ................................ C08K 5/3445; C08K 7/24
See application file for complete search history.

(56) References Cited

U.S. PATENT DOCUMENTS

| | | | |
|---|---|---|---|
| 2011/0003965 A1* | 1/2011 | Lin ........................ | B82Y 30/00 528/310 |
| 2012/0153233 A1* | 6/2012 | Gibon ..................... | H01B 1/24 252/506 |
| 2013/0005920 A1* | 1/2013 | Lin ........................ | B82Y 30/00 525/436 |

\* cited by examiner

*Primary Examiner* — Robert Harlan
(74) *Attorney, Agent, or Firm* — Thomas | Horstemeyer, LLP (57) ABSTRACT

Embodiments of the present disclosure provide for polymer nanocomposites, methods of making polymer nanocomposites, and the like.

9 Claims, 10 Drawing Sheets

Scheme 1

Scheme 1

POLYMER NANOCOMPOSITES AND METHODS OF MAKING NANOCOMPOSITES

CROSS-REFERENCE TO RELATED APPLICATION

This application claims priority to U.S. provisional application entitled "POLYMER NANOCOMPOSITE AND METHODS OF MAKING NANOCOMPOSITES," having Ser. No. 61/722,349, filed on Nov. 5, 2012, which is entirely incorporated herein by reference.

BACKGROUND

Polymer/carbon nanotube (CNT) composites are expected to have good processability characteristics of the polymer and excellent functional properties of the CNTs. The challenge, however, is how to enhance dispersion and alignment of CNTs in the matrix, as they tend to form aggregates or bundles due to the van der Walls interaction between them. There have been many efforts to improve the dispersion of CNT in polymer composites. However, there is still a need to develop compositions that can achieve this goal and overcome some of the deficiencies of current solutions.

SUMMARY

Embodiments of the present disclosure provide for polymer nanocomposites, methods of making polymer nanocomposites, and the like.

An embodiment of the polymer nanocomposite, among others, includes: a polymer selected from the group consisting of: polyetherimide (PEI) polymer, polyether sulfone (PES), polyimide (PI), polyaryletherketone (PAEK), and general engineering plastic such as polycarbonate (PC), polyamide (PA), polybutylene terephthalate (PBT); an ionic liquid, and carbon nanotubes. In an embodiment, the polymer is a PEI polymer.

An embodiment of the method of making a polymer nanocomposite, among others, includes: mixing an ionic liquid with a plurality of carbon nanotubes to form a gel: and mixing the gel with a polymer selected from the group consisting of: polyetherimide (PEI) polymer, polyether sulfone (PES), polyimide (PI), polyaryletherketone (PAEK), and general engineering plastic such as polycarbonate (PC), polyamide (PA), polybutylene terephthalate (PBT), to form the polymer nanocomposite.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

DISCUSSION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, physics, and the like, which are within the skill of the art. Such techniques are explained fully in the literature.

The following examples are put forth so as to provide those of ordinary skill in the an with a complete disclosure and description of how to perform the methods and use the compositions and compounds disclosed and claimed herein. Efforts have been made to ensure accuracy with respect to numbers (e.g., amounts, temperature, etc.), but some error s and deviations should be accounted for. Unless indicated otherwise, parts are parts by weight, temperature is in ° C. and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself and each of these documents or references ("herein cited references"), as well as each document or reference cited in each of the herein-cited references (including any manufacturer's specifications, instructions, etc.) are hereby expressly incorporated herein by reference.

Discussion:

Embodiments of the present disclosure provide for polymer nanocomposites, methods of making polymer nanocomposites, and the like. In an embodiment the polymer nanocomposite includes a plurality of carbon nanotube. In an embodiment the carbon nanotubes are dispersed within the nanocomposite. An advantage of the polymer nanocomposite is that it has a high electrical conductivity, high mechanical properties, and high thermal stability, unlike other nanocomposites, which may be attributed to the well dispersed nanocomposites. As a result, embodiments of the present disclosure can be used in the auto, aerospace, and electronic industries.

In an embodiment, the polymer nanocomposite includes a polymer such as a polyetherimide (PEI) polymer, an ionic liquid, and carbon nanotubes. In an embodiment, the polymer can be PEI, polyether sulfone (PES), polyimide (PI), polyaryletherketone (PAEK), and general engineering plastic such as polycarbonate (PC), polyamide (PA), and polybutylene terephthalate (PBT).

In an embodiment, the PEI polymer can be about 45 to 97.9 weight percent of the polymer nanocomposite. In an embodiment, the ionic liquid can be about 2 to 50 weight percent of the polymer nanocomposite. In an embodiment, the carbon nanotubes can be about 0.1 to 5 weight percent of the polymer nanocomposite. In an embodiment, the weight percent for each component can be as followings: about 85 weight of PEI polymer, about 5 weight percent of carbon nanotubes, and about 10 weight percent of ionic liquid.

In an embodiment, the polyetherimide (PEI) polymer is synthesized via the condensation polymerization of dianhydride and diamine at a temperature of about 20 to 320° C., which belongs to the polyimide family of polymers, is also a high performance thermoplastic known for its high heat resistance and good mechanical properties. In an embodiment, the PEI polymer has a glass transition temperature ($T_g$) of about 209 to 277° C., a heat distortion temperature (HDT) of about 170° C., to 230° C. In an embodiment, a general structure of PEI can be:

where n is 1 to 10,000.

In an embodiment, the carbon nanotube can be described as cylindrical carbon molecules (e.g., fullerenes) that have very large aspect ratios. In an embodiment, the carbon nanotube can have a length of about 1 μm to 50 μm and a diameter of about 2 nm to 150 nm. In an embodiment, a carbon nanotube can include a single or multiwalled carbon nanotube, where the multi-walled nanotubes have two or more layers in the cross section of the cylindrical structure.

In another embodiment, the carbon nanotube can be replaced with or supplemented with grapheme, grapheme oxide, and/or carbon black.

In an embodiment, the ionic liquid can refer to a salt that has a melting point of about −100° C. and around 300° C. In an embodiment, ionic liquids can include one or more cations or cationic components, and one or more anions or anionic components. In an embodiment, the cations or anions may be related species in equilibrium.

In an embodiment, the cation can refer to a positively-charged atom, molecule, or compound. In an embodiment, the cation can be: an imidizolium-based cation that includes an imidizolium group, a pyridinium-based cation that includes a pyridinium group, an ammonium-based cation that includes an ammonium group, a phosphonium-based cation that includes a phosphonium group, a thiazolium-based cations that includes a thiazolium group, a triazolium-based cation that includes a triazolium group, an oxazolium-based cation that includes an oxazolium group, a pyrazolium-based cation that includes a pyrazolium group, a pyrazinium-based cation that includes a pyrazinium group, each of which may be substituted (e.g., with halogen, alkyl, alkene, and the like).

In particular, the cationic components can include: 1-neopentyl-3-methylimidazolium, 1-isopropyl-3-methylimidazolium, 1-methylimidazolium, imidazolium, 1,3-dimethylimidazolium, tetramethylammonium, 2-methylimidazolium, 4-methylimidazolium, 1,2-dimethylimidazolium, 1,4-dimethylimidazolium, 1,2,3-trimethylimidazolium, 2,4,5-trimethyloxazolium, 1-trifluoroacetylimidazolium, 1-methylbenzimidazolium, 1,3-dimethylbenzimidazolium, pyridinium, 1,4-dimethylpyridinium, 2,6-lutidinium, 3,5-lutidinium, pyrazinium, 1-methylpyrazinium, 2-methylpyrazinium, 2,3-dimethylpyrazinium, 2,3,5-trimethylpyrazinium, 2,3,5,6-tetramethylpyrazinium, 1,2,3,5,6-pentamethylpyrazinium, quinoxalinium, pyrimidinium, 4,6-dimethylpyrimidinium, bipyrimidinium, and 1-methylbipyrimidinium, each of which can be substituted.

In an embodiment, the anion can refer to a negatively-charged atom, molecule, or compound. In an embodiment, the ionic liquid anion can include: a halogen (e.g., chloride, bromide, iodide), bisulfate, triflate, tetrafluoroborate, and methylsulfate.

In an embodiment, the polymer nanocomposite has a relatively high electrical conductivity as compared to universal polyimide. In an embodiment, the polymer nanocomposite has a volume resistivity of about $3.82 \times 10^{13}$ Ω·mm to $8.8 \times 10^2$ Ω·mm.

In an embodiment, the polymer nanocomposite has relatively high mechanical properties as compared to universal polyimide. In an embodiment the mechanical properties include tensile strength, storage modulus, and breaking elongation in an embodiment, the polymer nanocomposite has an increment of tensile strength about 5% to 95% at room temperature, compared with neat PEI. In an embodiment, the polymer nanocomposite has an increment of storage modulus about 2% to 50% at 50° C., compared with neat PEI. In an embodiment, the polymer nanocomposite has a breaking elongation of about 10% to 5% at room temperature.

In an embodiment, the polymer nanocomposite has a relatively high thermal stability as compared to universal polyimide. In an embodiment, the polymer nanocomposite has an increment of thermal stability about 1% to 15% at 30 wt % weight loss, compared with neat PEI.

In an embodiment, the polymer nanocomposite has a relatively high fluidity as compared to universal polyimide, which corresponded to a low glass transition temperature. In an embodiment, the polymer nanocomposite has a decrement of glass transition temperature about 0.5% to 30%, compared with neat PEI.

In an embodiment, a method of making a polymer nanocomposite can include mixing an ionic liquid with a plurality of carbon nanotubes to form a gel. In an embodiment, the ionic liquid and the carbon nanotubes can be mixed (e.g., grinded) for a time frame (e.g., about 10 minutes to hours) to form a paste (e.g., a black paste). Subsequently, the gel can be mixed with a polyetherimide (PEI) polymer to form a PEI nanocomposite. In an embodiment, the gel and the PEI polymer can be mixed (e.g., sonicate for about 10 min to hours) to from the PEI polymer nanocomposite. In an embodiment the PEI can be dissolved in a solvent (e.g., dichloromethane) prior to mixture with the gel. In an embodiment, the components used to form the PEI nanocomposite are used in amounts to achieve the desired weight percent for the components as described herein.

As mentioned above, the method of making PEI nanocomposite can expanded to other special engineering plastics such as polyether sulfone (PES), polyimide (PI), polyaryletherketone (PAEK), and general engineering plastic such as polycarbonate (PC), polyamide (PA), polybutylene terephthalate (PBT). In an embodiment, a suitable solvent is used, such as dichloromethane (DCM) or chloroform, which can dissolve the polymer and is miscible with ionic liquid.

Example

Brief Introduction:

A simplified and an eco-friendly method to develop commercial thermoplastic polyetherimide (PEI) nanocomposite with high mechanical properties and electrical conductivity is reported. The usage of bucky gels mixed with 10 wt % room temperature ionic liquid (IL), 1-Butyl-3-methyl imidazolium hexafluorophosphate ([BMIM][PF$_6$]) and 1.0 wt % industrial grade multi-walled carbon nanotubes (MW-CNTs) in PEI exhibited a good conductivity of $8.39 \times 10^6$ Ω·mm with 110.8 MPa tensile strength at room temperature. The interaction of IL with MWCNT is evidenced by Raman spectroscopy and X-ray powder diffraction (XRD) patters. Scanning electron microscope (SEM) images show well individually dispersed MWCNTs in PEI matrix. A network formation of MWCNTs was observed thought PEI matrix at loading of 5.0 wt % MWCNT and 10 wt % IL. The free ions of IL and the network of MWCNTs provide an excellent channel for transferring electrons. Besides, IL is a good plasticizer for PEI, with adding only a small amount of IL (2 wt %) to PEI, there is a reduction of 14° C. for glass transition temperature reduce which is useful for plastic polymer manufacture. It should be noted that the thermal stability and mechanical properties will be weakened by only adding more IL content, while they will be reinforced as well as the increase of conductivity by adding the MWCNT-IL gels to polymer. The results showed a unique combination of properties, such as high electrical conductivity, high mechanical properties, and high thermal stability at low loading of MWCNTs. The enhancement of these properties provides a great potential application in aerospace and electronic industries for plastic polymer.

Introduction:

Polymer/carbon nanotube (CNT) composites are expected to have good processability characteristics of the polymer and excellent functional properties of the CNTs. The critical challenge, however, is how to enhance dispersion and alignment of CNTs in the matrix, as they tend to form aggregates or bundles due to the van der Walls interaction between them[1]. In recent years, there have been many efforts to improve the dispersion of CNT in polymer composites. The modification of CNTs with polymers is mainly divided into two categories, including non-covalent[2-8] and covalent[9-15] bonding between CNT and polymer. Non-covalent CNT modification concerns the physical adsorption of polymers to the surface of CNTs, and the covalent method is to establish strong chemical bonds between CNTs and polymers. Christopher et al used CNTs as seed to facilitate the crystallization of polythene (PE), polypropylene (PP) and polyamide (PA66) on the surface of CNTs to achieve the modification[5,16,17]. The crystallization on the surface not only preserves the structural integrity of CNTs, but also provides desirable interaction between CNTs and crystallizable polymer. Cheng et al[14] used grafting method to get multi-walled carbon nanotubes (MWCNTs)/polyetherimide (PEI) composites, and the MWCNTs could be dispersed well in polymer matrix, and the tensile strength and modulus of PEI composite grafted with MWCNT increased obviously with the MWCNTs' concentration. Liu et al.[18] prepared PEI/MWCNTs composite films with well dispersed MWCNTs in the polymer matrix based on the in-situ polymerization method. The elastic moduli of the nanocomposites were significantly improved by about 148% with only 1 wt % MWCNTs. But these chemical modifications were generally poorly controlled and time/energy consuming, which may result in inconsistent results in the performance of the nanocomposites. Other methods including ultrasound and melting blend were involved in improving the dispersion of MWCNT in polymer matrix.[19,20] Therefore, a simple and stable method to functionalize CNT is very important to the development and application of nanocomposite in industry.

Ionic liquids (ILs) have attracted a great deal of attention in recent years[21]. ILs is usually composed of large organic cation and either inorganic or organic anion. When used as solvent, ILs has many distinct advantages[22], such as extremely low volatility and toxicity, excellent thermal and chemical stability, high ionic conductivity and ease of recycling. ILs is considered as "green solvents" and a promising replacement for traditional organic solvents, and has found many practical applications in chemical industry and polymer science.[23,24] Tour et al. found ILs can be used for green chemical functionalization of carbon nanotubes by grinding them for minutes at room temperature, and individualized nanotube structures can be obtained.[25] Fukushima and Aida et al. have found that imidazolium based room temperature ionic liquids can be employed to disperse single walled carbon nanotubes (SWCNTs) by means of cation-π/π-π interaction.[26] Li et al. studied the interaction of IL with carbon nanotube by using Raman spectra, IR spectra and simulation method, and revealed that the IL interacted with carbon nanotube through weak van der Waals interaction other than "cation-π" interaction.[27,28] It has been mentioned that the highly entangled SWCNTs bundles are exfoliated to give much finer bundles which aids in better dispersion. The method on gels of CNTs and ILs has opened the possibility of processing CNT-ILs gels (called bucky gels) in a large scale by mechanical grinding.[29,30] Applications using CNTs dispersed in ILs by this method in sensors, actuators and electrochemistry have been described.[31-37]

The combination of the properties of ILs and CNTs can provide many advantages in polymer processing. On one hand, IL can be used as a plasticizer or lubricant for polymer.[37,38] This is very useful in polymer processing, especially for those with a high melt temperature or glass transition temperature, or with poor fluidity in melting. One the other hand, CNTs can be dispersed well in ILs, and this provides a simple and feasible method to make high performance nanocomposite with CNTs.

The thermoplastic polymer PEI has been widely applied in electronic industry, aerospace, and auto industry, due to its excellent thermal stability, radiation resistance and mechanical properties. But it has a high glass transition temperature, and this makes it poor mobility in material processing using melting method. By adding IL into the PEI matrix, we expect to be able to decrease the glass transition temperature, and increase the mobility of PEI in melting condition. By adding CNTs into the PEI matrix, we expect to obtain a high performance PEI nanocomposite with excellent mechanical properties and good conductivity. In this work, MWCNT was chosen to prepare CNT-IL bucky gels, because its low cost in commercialization. The composite membrane was made by spin coating, and the mechanical property, thermal stability and conductivity of the PEI/MWCNT-IL composites were studied to confirm our approach.

EXPERIMENTAL

Materials:

Polyetherimide (PEI) in fine powder form supplying by SABIC Innovative Plastics under the trade name of Grade ULTEM 1000P was used as received. The commercial MWCNTs were purchased from Nanolab Inc. with a diameter of 10-30 nm, length of 5-20 μm and purity of 90% (industrial grade). 1-Butyl-3-methyl imidazolium hexafluorophosphate ([BMIM][$PF_6$]) was purchased from sigma-aldrich with purity of 97%, and was vacuum-dried at 60° C. for 24 h to remove the moisture before use. Dichloromethane (DCM) was used as the solvent for PEI. Table 1 showed the structure of materials.

Figure 1:
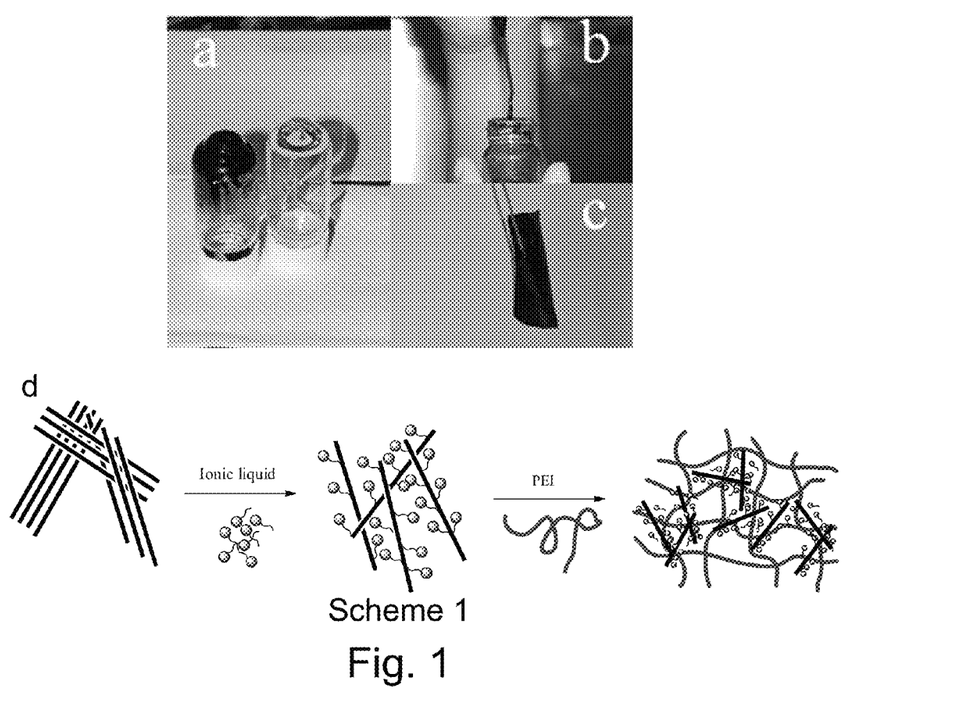
FIG. 1 illustrates: (a) a picture of MWCNT-IL gel (left) and neat IL (right); (b) extrusion of the gel from needle; (c) a picture of a PEI/IL/MWCNT free-standing film with 10 wt % IL and 1 wt % MWCNT in composite; and (di an illustration of the preparation process (Scheme 1)

Preparation of Composite:

The MWCNTs were mixed with [BMIM][$PF_6$] by grinding for 30 minutes until a black paste was obtained. The bucky gels were made in different ratios by weight of MWCNTs to [BMIM][$PF_6$], from 1:4 to 1:200. Then the bucky gels were added into PEI/DCM solutions, and bath sonicated for 1 hr. A black homogeneous solution was obtained. The spin coating method was used to make composite membrane at room temperature. The amount of IL used in this work is 2 wt %, 5 wt %, 10 wt %, 20 wt %, 30 wt %, 40 wt %, and 50 wt % of composites, and the amount of MWCNTs used is 0.1 wt %, 0.5 wt %, 1 wt %, 2 wt %, and 5 wt % of composites FIG. 1 shows the pictures of MWCNT-IL gel and PEI/IL/MWCNT composite film and illustrates Scheme 1. The composite has a good toughness.

Characterizations:

The Raman spectroscopy was performed with a Raman Microscope ARAMIS UV (HORIBA), which is equipped with a 100 mW diode laser with an excitation wavelength of 785 nm. The X-ray powder diffraction (XRD) patters were performed on the mixtures of MWCNT and IL by a Bruker D8 Advance (40 KV, 40 mA) with Cu Kα ($\lambda$=1.5406 Å) irradiation at a scanning rate of 2°/imin in the 2θ range of 10-50°. Morphological study of the composite was carried out by using electron scanning electron microscope (SEM) on FEI Magellan/Quanta600 FEGSEM (USA). The cryo-fractured surfaces were coated with a thin layer of gold (5 nm). The vacuum was in the order of $10^{-4}$-$10^{-6}$ mmHg during scanning of the composite samples. A thin layer of gold was coated on the cryo-fractured surfaces of the film before scanning. Dynamic mechanical thermal analysis (DMA) was performed on DMA 242C (Netzsch, Germany)

in the thin tension mode, at a constant frequency of 1 Hz, static force at 0.3N, dynamic force at 0.2N, heating rate of 2 K/min under air atmosphere and the temperature range of 50 to 230° C. Tensile testing was done on a commercial universal testing machine (Changchun Zhineng Company, China) at room temperature with a crosshead speed of 5 mm/min. Specimens were cut from casting films with 50 mm gauge length and 5 mm width. The decomposition behavior of the composites was studied using a thermogravimetric analysis (TGA) TG 209 F1 Iris (Netzsch, Germany) thermogravimetric analyzer in nitrogen from 30 to 600° C. with a heating rate of 10° C./min. The thermal behavior of the nanocomposites was studied using a differential scanning calorimeter (DSC 204 F1 Phoenix, Netzsch, Germany). The heating rate was 10° C./min under a nitrogen atmosphere with a flow rate of 40 ml/min. The surface conductivities of the samples were measured using a Keithley 6517B (USA) source meter unit with Keithley Model 248 high voltage supply (USA). The results were obtained by averaging the conductivities from three different positions on each film.

Figure 3:
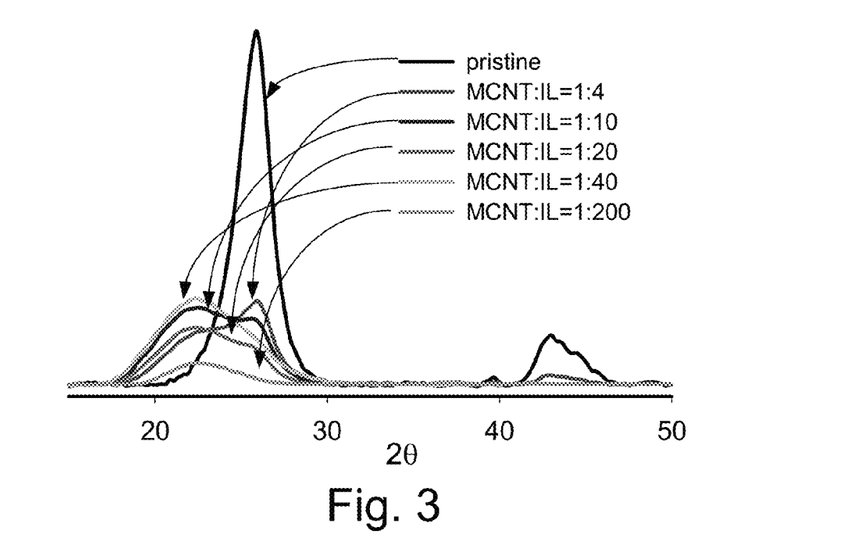
FIG. 3 illustrates XRD spectra of the pristine and modified MWCNTs
Figure 4:
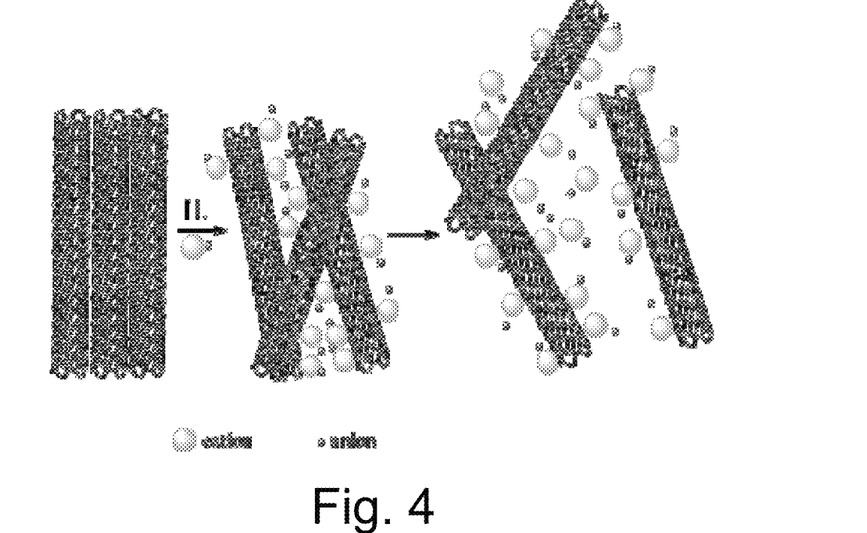
FIG. 4 illustrates the interaction of IL with MWCNT.

The interaction of IL with MWCNTs can be further certified by XRD. As shown in FIG. 3, there is an obvious narrow peak observed at 25-27° in pristine MWCNT, which belongs to the structure of MWCNT, indicating the interplanar spacing between carbon nanotubes. When increasing the concentration of IL in bucky gel, the peak became smoother and broader. As shown in the curves of MWCNT: IL=1:4, 1:10, 1:20, there are two peaks were divided from the narrow peak, and the larger peak became smoother, the smaller peak became more obvious. When the concentration to 1:40 or 1:200, there is almost only one broad peak observed. It is clear that the distance between the MWCNTs enlarged with increasing the concentration of IL to MWCNT, due to the strong interaction of IL with MWCNTs, and this effect make the bundle of MWCNT disassemble, the MWCNT can be dispersed separately in IL. The disappearing of the larger peak at 42-43° with increasing IL concentration further confirm the interaction. FIG. 4 showed the interaction of IL with MWCNTs.

In order to certify the improvement of bucky gel to PEI, the IL/PEI composites without MWCNTs were first studied.

TABLE 1

Chemical structures

| material | Chemical structure |
|---|---|
| PEI |  |
| [BMIM][PF$_6$] |  |

Figure 2:
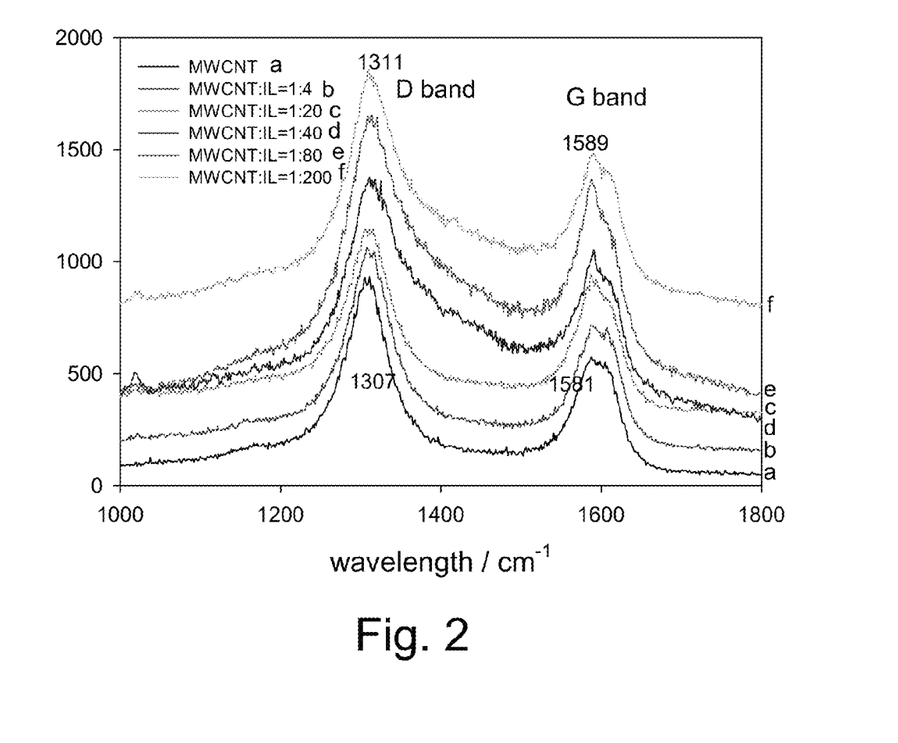
FIG. 2 illustrates Raman spectra of the pristine and modified MWCNTs (curves from top to bottom: MWCT: IL=1:200, MWCT:IL=1:80, MWCT:IL=1:40, MWCT: IL=1:20, MWCT:IL=1:4, MWCT)

Results and Discussion:

Characterization of [BMIM][PF$_6$] Modified MWCNTs:

The Raman spectrum of the pristine MWCNT and the gels of MWCNTs mixed with IL are shown in FIG. 2. Two strong peaks are observed. One peak around 1580 cm$^{-1}$ is referred as G band and originates from the tangential vibrations of the carbon atoms. The other one is around 1300 cm$^{-1}$ and is assigned as D band, which may be caused by the significant defects or disorders in the carbon nanostrctures. The D band is higher than G band was observed, indicating there are many defects in our MWCNT samples. The MWCNT used in this work is a commercial product with a low cost. For the MWCNT/gels, there exists a slight shift with increasing IL concentration. Compared with pristine MWCNT, there is a 4 cm$^{-1}$ up shift of D band and 8 cm$^{-1}$ up shift of G band for gel with MWCNT:IL 1:200, and no new vibrations are observed. The up shift in the spectra indicated the bonding of IL with MWCNTs, and it is probably due to the cation-p interaction between BMI and the carbon nanotubes and/or the perturbation of p-p stacking of multi-walls of the carbon nanotubes. Therefore, the MWCNT modification with IL is the physical interaction between MWCNT and IL, without chemical impairment of MWCNTs. The upshift of both D and G band in IL modified MWCNTs are also observed by Heinirich et al.[33]

Figure 5:
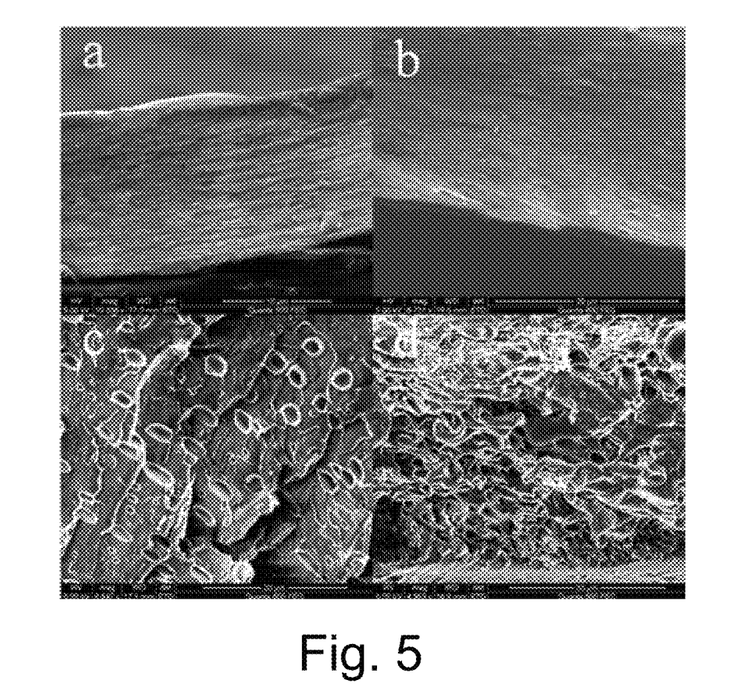
FIG. 5 illustrates an SEMI image of the composite film IL/PEI composites with different IL concentration: (a) pristine PEI; (b) with 2 wt % IL; (c) with 10 wt % IL; (d) with 30 wt % IL.

As shown in FIG. 5, the cross-section morphology of PEI with 2 wt % IL is smooth and uniform, as well as pristine PEI. But it became inhomogeneous with increasing IL concentration, and when the IL concentration up to 10 wt %, the phase separation observed. Many micropores were observed in polymer matrix, which were caused by the aggregation of IL molecules. With further increasing IL concentration in PEI, the phase separation of polymer matrix became more serious, not only accompanying with micropores, the morphology became rugged, as shown in FIG. 5d, with 30 wt % IL.

Figure 6:
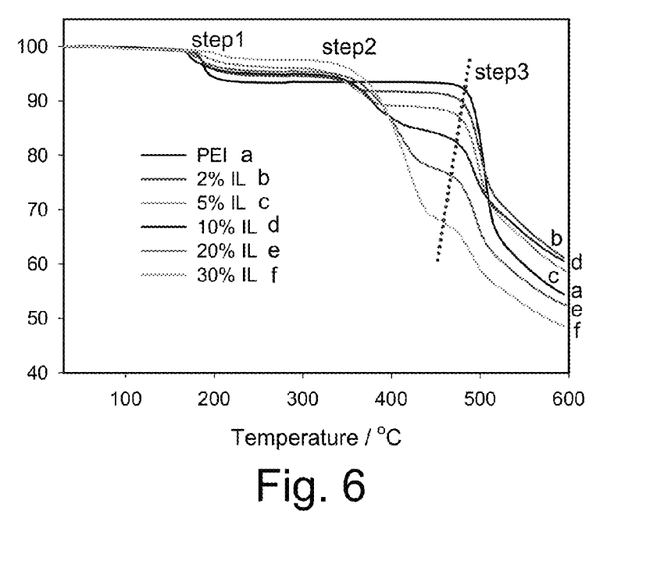
FIG. 6 illustrates the TGA weight loss of PEI and its IL composites
Figure 7:
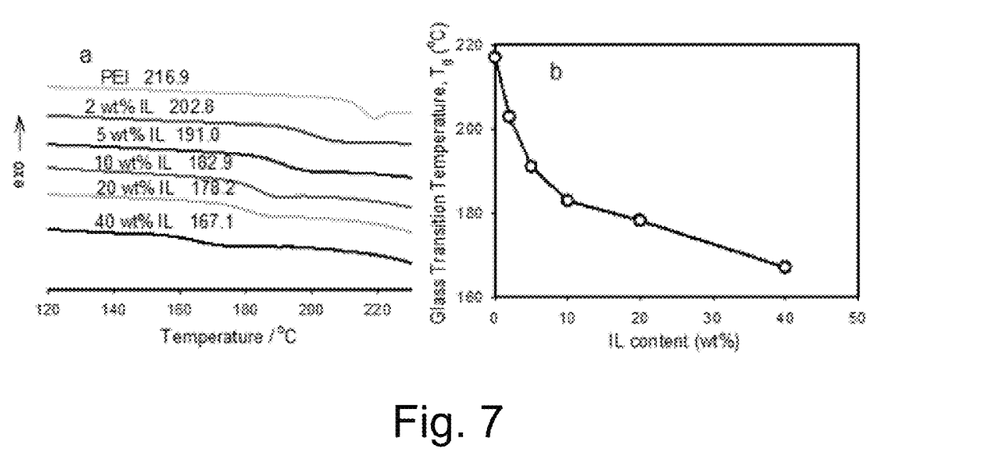
FIG. 7 illustrates: (a) a glass transition temperature plot of PEI/IL composites and (b) the decrease curve of $T_g$ with increasing IL concentration
Figure 12:
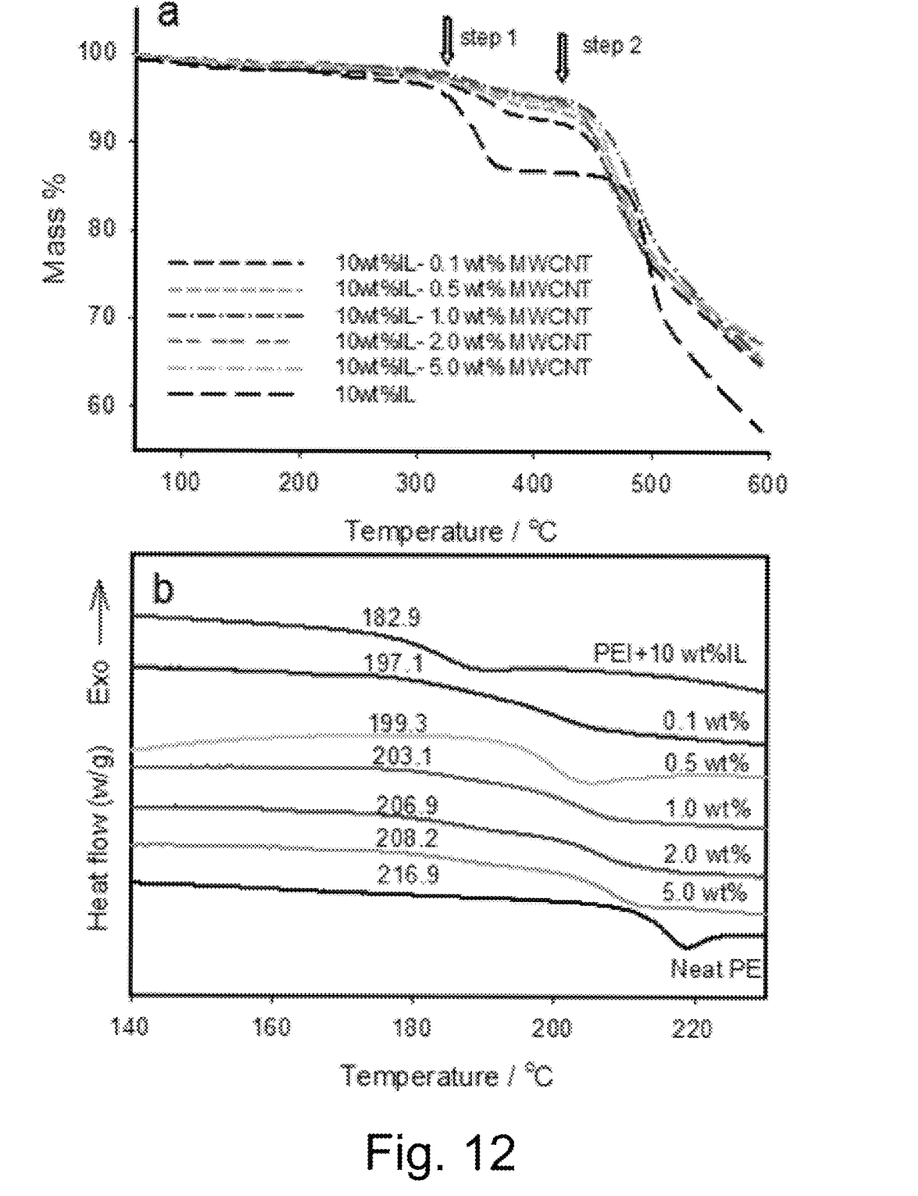
FIG. 12 illustrates: (a) TGA and (b) glass transition temperature plot of PEI/10 wt % IL and its MWCNT composites

The phase separation will influence the thermo-properties strongly. As shown in FIG. 6, the thermostability decreased with increasing IL concentration. The first weight loss may be caused by the evaporation of small molecule, which made the composites more stable. After annealing at 180° C. for 15 min, the first step will disappear, as shown in FIG. 12. The second weight loss indicated the decomposition of IL, as shown the step 1 in FIG. 12, the decomposition temperature of PEI with 10 wt % IL started from 308° C. to 366° C. and the loss weight is 9.5%. The third step showed the decomposition of PEI itself due to the cleavage of phenyl-phthalimide bonds.[39] As shown in FIG. 7, DSC curves show the distinct glass transition ($T_g$) of PEI and its nanocomposites membranes with loading different IL concentration. By adding 2 wt % IL to PEI, the glass transition temperature decrease sharply, from 216.9° C. to 202.8° C., the reduction of 14° C. indicated this IL is a good plasticizer for PEI.[38] With increasing IL concentration, $T_g$ further decreased, and the temperature decreased to 167.1° C. with 40 wt % IL, near 50° C. reduction, compared with pristine PEI. Therefore, by adding IL to PEI can help to increase the mobility of PEI in melting condition, and lower the manufacture temperature in industry, which make the process more mildly.

Figure 8:
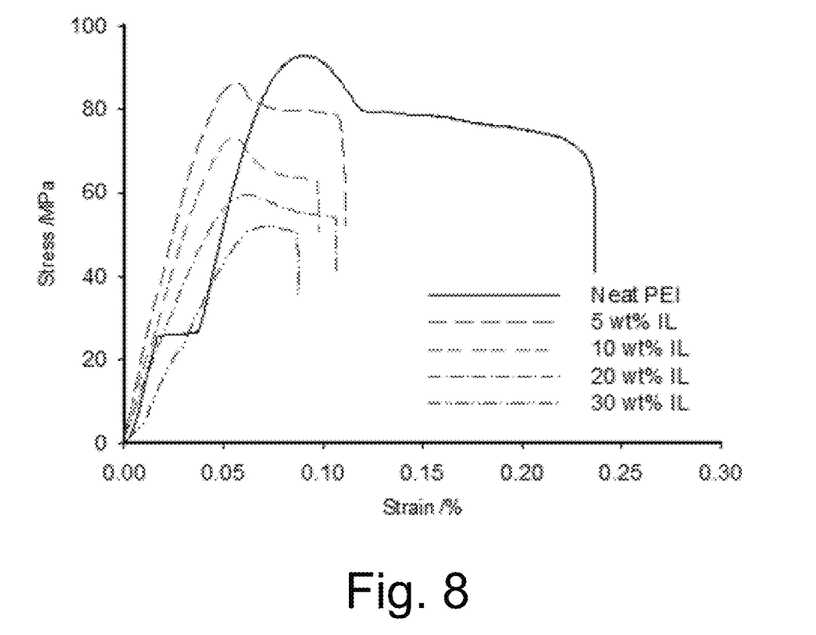
FIG. 8 illustrates typical stress-strain curves for neat PEI and its IL composites

Typical stress-strain curves for neat PEI and its nanocomposites with different IL concentration are shown in FIG. 8. The tensile strength changed little by adding 5 wt % IL, while the strain decreased from 23% to 11%, which indicated the adding of IL to PEI rise the brittleness of composite compared with neat PEI. By increasing IL concentration further, the tensile strength reduces, accompanying with strain decreases. Upon incorporation of 30 wt % IL, the elastic modulus of PEI is reduced by 40% from 1.67 to 1.01 GPa; and the tensile strength is decreased by 34% from 78.6 MPa to 51.2 MPa. Therefore, with addition of IL into PEI, the composites become fragile, due to the weak compatibility of IL and PEI, but with a small amount of IL, the mechanical property changes little.

Figure 9:
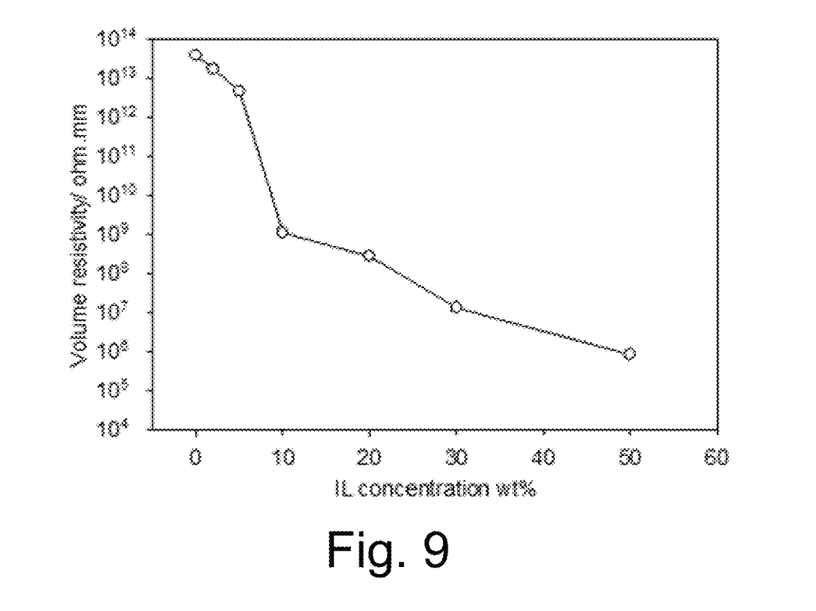
FIG. 9 illustrates DC resistivity of PEI and the composites with different IL concentration at room temperature

IL is composed of cation and anion, and there are free ions involved in IL, which can provide the transfer of electron in composites. The room temperature volume resistivity of PEI and PEI/IL composites with various concentrations of IL are shown in FIG. 9. The electrical resistivity decreases generally with increasing IL content. It decreases slightly when the IL content was low. Such as with 2 wt % IL, from $3.82 \times 10^{13}$ Ω·mm to $1.70 \times 10^{13}$ Ω·mm, and to $4.57 \times 10^{12}$ Ω·mm for 5 wt % IL/PEI composite. However, the volume resistivity sharply decreased from $4.57 \times 10^{12}$ Ω·mm at 5 wt % IL loading to $9.89 \times 10^{8}$ Ω·mm at 10 wt % IL loading. The volume resistivity decreases dramatically about 4 power orders of the 10 wt % IL. The resistivity further decreased obviously with increasing the IL loading, and can fall down to $8.34 \times 10^{5}$ Ω·mm at 50 wt % IL loading, and this composite can be considered as a good semiconductor. At the small amount of IL loading, there is no IL domain formed in polymer matrix, and free ions are not easily transferred through PEI matrix. With increasing IL content, the aggregate of IL in PEI matrix (FIG. 5c) provide an enough space to transfer electrons, and the conductivity increased sharply at this point (10 wt % IL in our experiment). So the conductivity percolation threshold of the IL composites in our study is between 5 wt %-10 wt %, which means with the increasing loading of IL, IL aggregate or even a continuous phase of IL (30 wt % IL) can provide channels for the electrons transferring through the whole matrix more IL content, more easily the electrons transfer.

Figure 10:
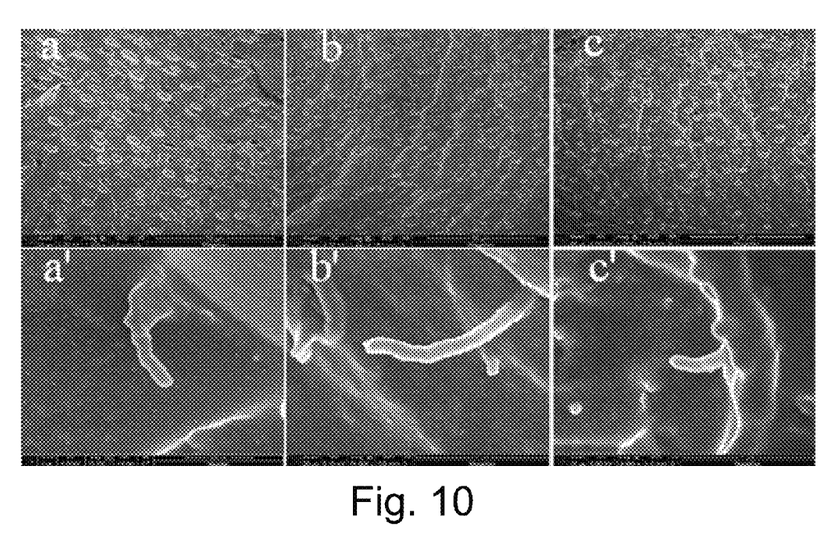
FIG. 10 illustrates SEM image of PEI composite film IL/MWCNT/PEI composites with 10% IL and different MWCNT concentration: (a) 0.1 wt % MWCNT; (b) 1.0 wt % MWCNT, (c) 2.0 wt % MWCNT; (a'), (b'), (c') is the magnified image of (a), (b), (c) respectively.

FIG. 10 shows SEM images of the cryo-fractured surface of the PEI/IL/MWCNT composites, in which the IL aggregates with diameter of several micrometers are observed homo-dispersed, and the MWCNTs are homogeneously dispersed at the individual level throughout the PEI matrix, no obvious MWCNTs aggregation occurred, except FIG. 10c, there is a slight agglomerate of MWCNTs in 2.0 wt % MWCNT composite. As observed from FIG. 10, the diameter (100-200 nm) of MWCNTs is much thicker compared to pristine MWCNTs (10-30 nm), which confirmed that MWCNTs are wrapped by polymer on the helical conformation of the carbon nanotubes.

Figure 11:
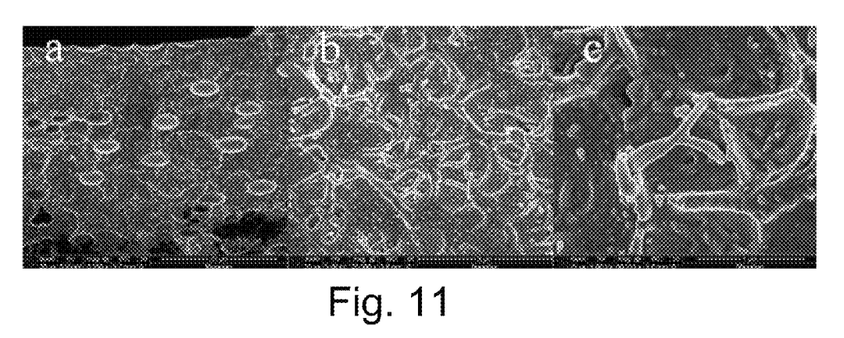
FIG. 11 illustrates: (a) SEM image of PEI composite film with 10% IL and 5.0 wt % MWCNTs concentration; and (b) and (c) magnified images of (a).

FIG. 11 shows the SEM of PEI composite with 10% IL and 5.0 wt % MWCNTs concentration. There is an abundance of fine and well dispersed MWCNTs almost throughout the PEI matrix, together with a slight agglomerate in part. The interaction of IL with MWCNT helps effectively preventing nanotube aggregation and results in a controlled morphology. Other than, a network of MWCNTs was observed on the surface. The MWCNTs overlap in PEI matrix, and the overlapped MWCNTs are linked by MWCNT bridges (FIG. 11c). Similar kinds of network morphologies have been observed by other researchers.[39,40]

The thermal behavior of PEI/IL composite membranes and its composites membranes with the different MWCNT concentration were studied by TGA analysis. Two steps were observed in $N_2$ atmosphere thermal degradation of all samples, as shown in FIG. 12a. As mentioned before, the first step belongs to the decomposition of IL itself, due to the interaction of IL with MWCNT, the loss weight of this step is reduced by adding MWCNT to composites. As shown in FIG. 12a, the main decomposition of PEI was increased with increasing MWCNT concentration, and it reached the maximum value at 1.0 wt %, where it started to decrease with further increase of MWCNT concentration. The data was summarized in Table 2.

The thermal stability could be improved by adding carbon nanotubes, because of its excellent thermal stability, and this can slow down the materials' volatilization or decomposition. Meanwhile, the well dispersion of MWCNT in the polymer matrix restricted the segmental motion of polymer chain, which is attributed to the increase of decomposition temperature. However, the increase content of MWCNT will induce aggregation of MWCNT in part, and then result in the reduction of decomposition temperature. So the best thermal stability is at the point of 1.0 wt % MWCNT loading, then it decrease with increasing MWCNT content to 2.0 wt %. Due to the network formation of MWCNT, the decomposition temperature increased again at 5.0 wt % MWCNT loading (Temp. at 10 wt % loss weight in Table 2). Other than, due to the good thermal stability of MWCNT, more residue content of composites with more MWCNT content. With addition of IL into PEI, the thermal stability of PEI will reduce, however, it will be improved by adding MWCNT.

TABLE 2

Thermal properties of PEI/10 wt % IL composite and its composites with different MWCNT concentration.

| MWCNT wt % | Temp. at 5 wt % weight loss (° C.) | Temp. at 10 wt % weight loss (° C.) | Temp. at 30 wt % weight loss (° C.) | $T_g$ by DSC (° C.) | $T_g$ by DMA (° C.) |
|---|---|---|---|---|---|
| 0 | 328 | 353 | 511 | 182.9 | 190.2 |
| 0.1 | 354 | 445 | 543 | 197.1 | 199.9 |
| 0.5 | 368 | 453 | 553 | 199.3 | 208.1 |
| 1.0 | 413 | 468 | 556 | 203.1 | 212.2 |
| 2.0 | 408 | 450 | 558 | 206.9 | 213.2 |
| 5.0 | 383 | 459 | 563 | 208.2 | 213.5 |

As shown in FIG. 12b. DSC curves show the distinct glass transition ($T_g$) of PEI/IL composite and its nanocomposites membranes with loading different content MWCNT. All the results are listed in Table 2. As mentioned before, IL is a good plasticizer for PEI, a small amount of IL will reduce the glass transition temperature. Compared with neat PEI ($T_g$=216.9° C.), $T_g$ is decrease by about 34° C. alter loading 10 wt % IL, from 216.9 to 182.9° C. However, it will be improved again by adding MWCNT. The $T_g$ of composite is increased by about 14° C. alter incorporating 0.1 wt % MWCNT into PEI/IL composite, from 182.9 to 197.1° C., which indicates the mobility of polymer chains is reduced due to the constraint effect of MWCNTs. It can be concluded, IL decrease the glass transition temperature of composite, while well dispersed MWCNT increase it.

Figure 13:
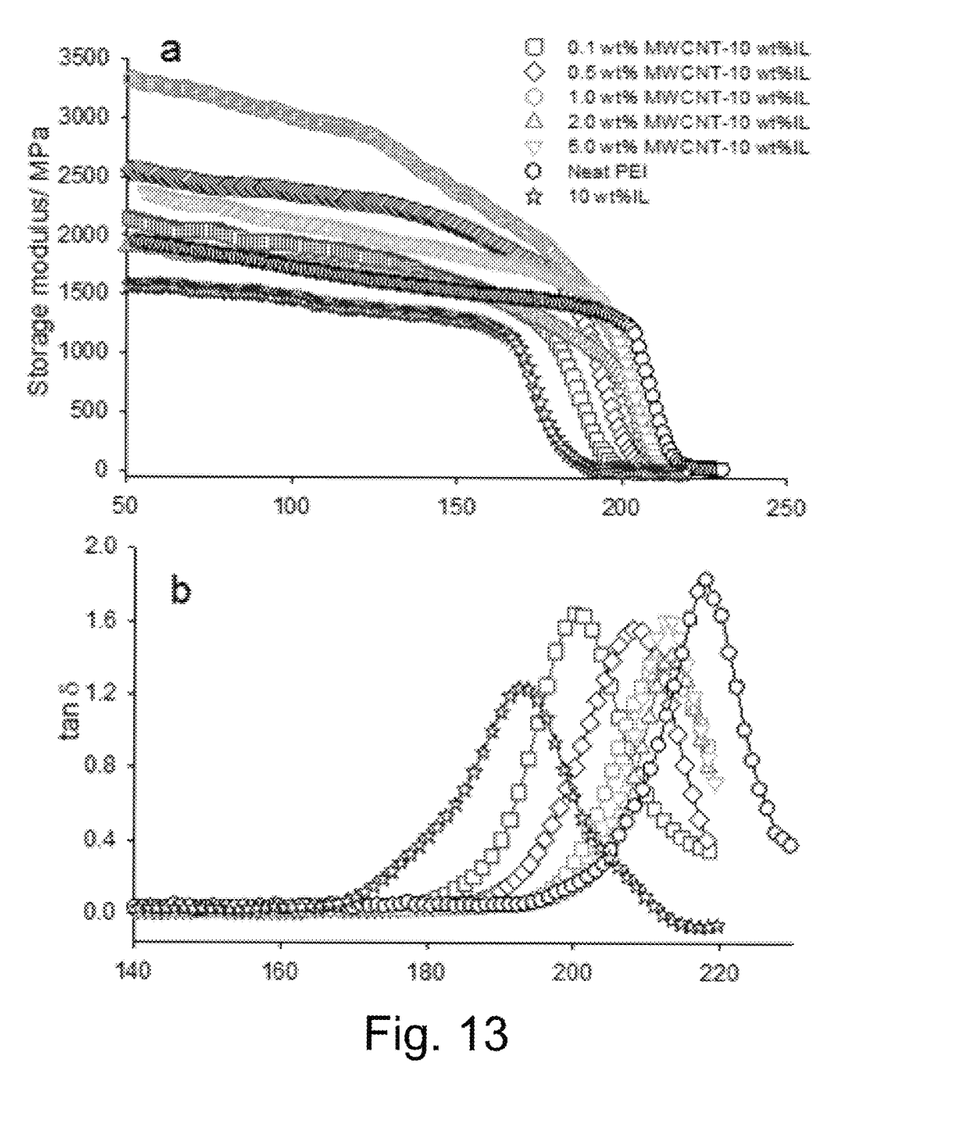
FIG. 13 illustrates DMA results for PEI and its composites with 10 wt % IL and different MWCNT concentration: (a) the curves of storage modulus; and (b) tan δ versus temperature.

DMA is a very important tool for studying relaxation in polymers and in determining the performance of material under stress and temperature. FIG. 13 shows the DMA curves as a function temperature for PEI and its nanocomposites. As shown in FIG. 13a, compared with neat PEI, the storage modulus (E') for the PEI composites with 10 wt % IL is lower, while the storage modulus for PEI/IL/MWCNT composites are higher. The storage modulus increased significantly with increasing MWCNT concentration from 0 to 1.0 wt %, and at the concentration of 2.0 wt %, it is reduced, but with further increasing MWCNT, 5.0 wt % in FIG. 13a, the modulus increases again. The results are summarized in Table 3. The storage modulus at 100° C. is 3.01 GPa for the composite containing 1.0 wt % MWCNT, which exhibits about 103% increment and 73% increment compared with PEI/IL composite of 1.48 GPa and neat PEI of 1.73 GPa respectively. The significant improvement in storage modulus of PEI nanocomposites is ascribed to the combined effect of high performance and fine dispersion of high aspect ratio MWCNT filler. And this is coincident with thermal properties of PEI composites. Though the storage modules decrease with the addition of IL, it is improved by adding MWCNT to composite. The reduction of storage modulus of 2.0 wt % MWCNT is caused by the slight aggregation of MWCNTs, while the increase again of 5.0 wt % MWCNT is caused by the network formation of MWCNTs in PEI matrix, which needs more energy to breakdown the entanglement structure.

Figure 14:
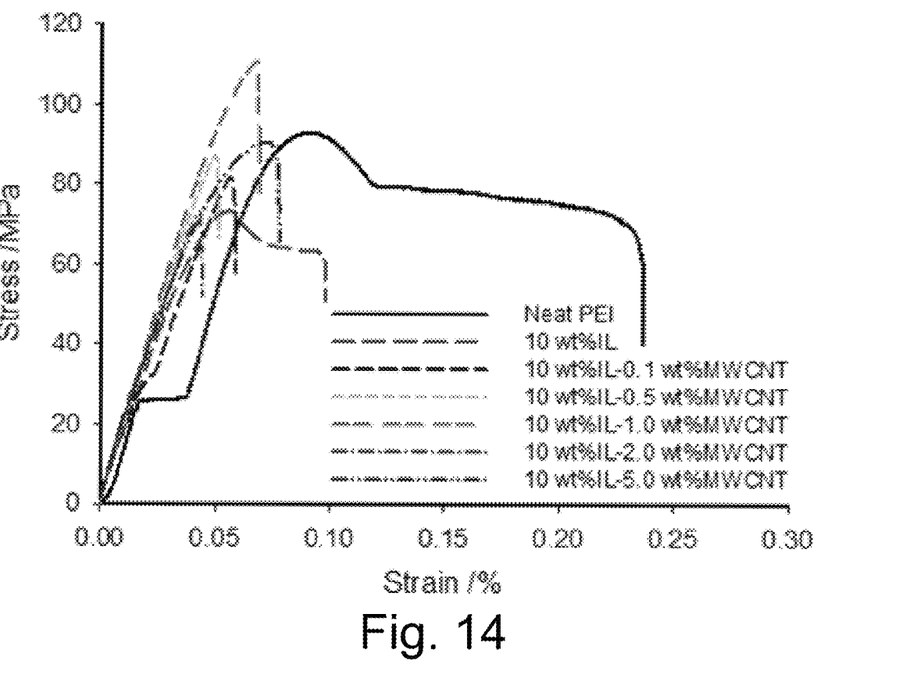
FIG. 14 illustrates typical stress-strain curves for neat PEI and its composites with 10 wt % IL and different MWCNT concentration
Figure 15:
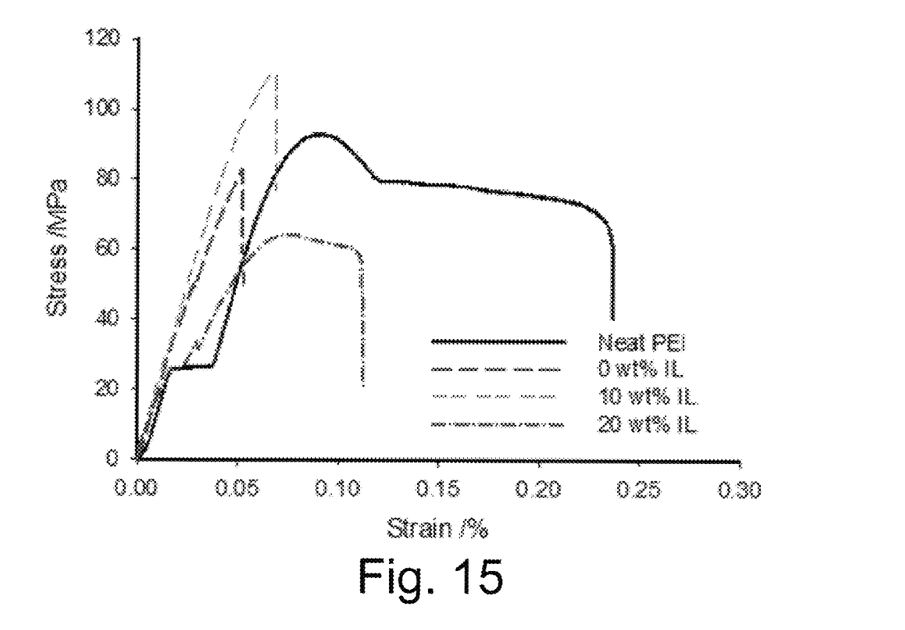
FIG. 15 illustrates typical stress-strain curves for neat PEI and its composites with 1.0 wt % MWCNT and different IL concentration

The similar results are revealed in tensile strength. As shown in FIG. 14, the tensile properties of the composites with 10 wt % IL decrease much. Compared with neat PEI, the tensile strength and tensile modulus decreases from 78.6 to 63.1 MPa, and from 1.67 to 1.56 GPa respectively. However, with addition of a small amount of MWCNTs, the tensile properties of composites are improved, even stronger than neat PEI, it can be seen the PEI/IL/MWCNT with 1.0 wt % MWCNT loading is the best, the trend of the tensile properties with increasing MWCNT is in agreement with DMA results. Compared with MWCNT/IL composite, the tensile strength of PEI is improved by about 76% from 63.1 MPa to 110.8 MPa; and the tensile modulus is improved by about 42% from 1.56 GPa to 2.21 GPa. And it increases by about 41% and 32% for tensile strength and tensile modulus respectively, compared with neat PEI. A pronounced yield and post-yield drop are observed for neat PEI and PEI/IL composites while there is no noticeable yield for MWCNT reinforced PEI nanocomposites. Therefore, with adding a small amount of the functionalized MWCNT, the nanocomposite films become stiffer and stronger due to the strong interfacial interactions between the nanotubes and PEI matrix. Furthermore, the beat elongation at break of PEI/IL/MWCNT composite with 5.0 wt % MWCNT loading is obtained, due to the network formation of MWCNTs in polymer matrix. It is concluded, the mechanical properties of PEI decrease with the addition of IL, while are improved by adding MWCNT-IL gels to polymer. Other than, the tensile properties of PEI/IL/MWCNT composites with 1.0 wt % MWCNT and different IL content are contrasted (FIG. 15). Compared with neat PEI, the tensile strength changes little, but the elongation at break reduced a lot with only 1.0 wt % MWCNT loading, which indicates that the composite become fragile. While the tensile strength of composite with 10 wt % IL and 1.0 wt % is improved by adding MWCNT-IL gels into PEI, which indicates that the composite become stiffer and stronger. However, the tensile strength decreases with increasing IL content, indicating the composite become weaker, but more flexible, indicated by the increase of elongation at break.

TABLE 3

Mechanical properties of neat PEI and its composites.

| | | Storage modulus at 100° C. (GPa) | Tensile strength (MPa) | Tensile modulus (GPa) | Elongation at break (%) |
|---|---|---|---|---|---|
| | | | Neat PEI | | |
| | | 1.73 | 78.6 | 1.67 | 23 |
| | | | PEI/10 wt % IL | | |
| | | 1.48 | 63.1 | 1.56 | 9.7 |
| MWCNT wt % | 0.1 | 1.94 | 81.0 | 1.82 | 5.9 |
| | 0.5 | 2.37 | 87.2 | 2.08 | 5.0 |
| | 1.0 | 3.01 | 110.8 | 2.21 | 6.8 |
| | 2.0 | 1.76 | 73.2 | 1.92 | 4.3 |
| | 5.0 | 2.12 | 90.5 | 2.06 | 7.7 |

Figure 16:
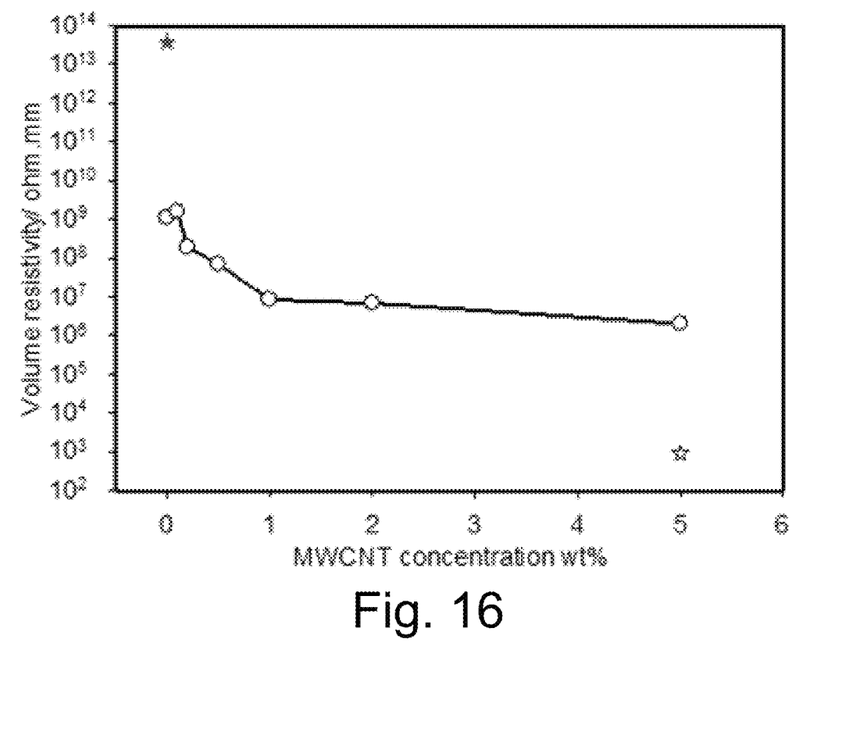
FIG. 16 illustrates DC resistivity of PEI composites with 10 wt % IL and different MWCNT concentration at room temperature. Red solid star (top left) is the resistivity of neat PEI, blue hollow star (bottom right) is the resistivity of PEI composite with 50 wt % IL and 5.0 wt % MWCNT.

IL can provide free ions for transferring electrons throughout polymer matrix, and a PEI/IL, composite with good conductivity was obtained in our experiment. Carbon nanotube is one of the best nanofillers to improve the conductivity of materials. MWCNT-IL gels combined the advantage of IL and carbon nanotube, and a better improvement of conductivity for PEI is observed in this work. The room temperature volume resistivity of PEI and PEI/MWCNT/IL composites with 10 wt % IL and various concentrations of MWCNT are shown in FIG. 16. With addition of 10 wt %. IL loading was chosen in our experiment, because it has been proved a breaking point for increasing conductivity of PEI, as shown in FIG. 9. The electrical resistivity decreases generally with increasing the content of MWCNT. It decreases a lot when the MWCNT content was at 1.0 wt %, from $9.89 \times 10^8$ Ω·mm to $8.39 \times 10^6$ Ω·mm of MWCNT/IL/PEI composite, and then slightly decreases with increasing MWCNT content, about 2.01, $10^6$ Ω·mm at loading of 5.0 wt % MWCNT. At this point, the composite can be considered as a good semiconductor, compared with neat PEI ($3.82 \times 10^{13}$ Ω·mm, red solid star in FIG. 16), the volume resistivity decreased by 8 power orders. Furthermore, the resistivity falls down to $8.85 \times 10^2$ Ω·mm at 5.0 wt % loading of MWCNT and 50 wt % IL, the resistivity of composite decreases dramatically about 11 power orders. To our best knowledge, the obtained resistivity is one of the lowest values for MWCNT/polyimide composites films with the same MWCNT loading. On one hand, the free ions of IL in polymer matrix takes a role effect on transferring electrons, on the other hand, a network formation of MWCNTs provides channels for the electrons transferring through the whole matrix.

CONCLUSION

Bucky gels with multi-walled carbon nanotubes (MWCNT) in IL were prepared by grinding method. Then the MWCNTs gels suspensions were mixed with PEI solutions by stirring and sonication, and a simple nanocomposite film including IL and MWCNT with high conductivity and mechanical properties could be obtained by spin coating method. There is a strong interaction between IL and MWCNT, which result in the separation of MWCNTs, and make MWCNTs dispersed well in polymer matrix. IL is a good plasticizer for PEI, with adding only a small amount of IL (2 wt %) to PEI, there is a reduction of 14° C. for glass transition temperature reduce. Meanwhile IL can increase the conductivity of PEI composite. The volume resistivity can be decreased to 9.89×10$^8$ Ω·mm at 10 wt % IL loading. However, the thermal stability and mechanical properties will be weakened by adding more IL content. Fortunately, by adding the MWCNT-IL gels, the thermal stability and mechanical properties will be reinforced, as well as the increase of conductivity. The results showed a unique combination of properties, such as high electrical conductivity, high mechanical properties, and high thermal stability at low loading of MWCNTs. SEM revealed the individual MWCNTs dispersed in the PEI matrix which had a strong interfacial bonding with PEI matrix. The presence of MWCNT increased the thermal stability and mechanical property by a significant amount at only 1.0 wt % MWCNT and 10 wt % IL loading, which is the best value for the nanocomposites. The electrical conductivity was enforced by adding MWCNTs, and the values increased dramatically by increasing MWCNTs content, at 5.0 wt % loading of MWCNT, it can be reduced to a very low value, even only 8.85×10$^2$ Ω·mm together with 50 wt % IL loading.

References, each of which is incorporated herein by reference (1) Chakraborty, A. K.; Coleman, K. S. *J. Nanosci. Nanotechnol.* 2008, 8, 4013.
(2) Krstic, V.; Duesberg, G. S.; Muster, J.; Burghard, M.; Roth, S. *Chem. Mater.* 1998, 10, 2338.
(3) Star, A.; Stoddart, J. F.; Steuerman, D.; Diehl, M.; Boukai, A.; Wong, E. W.; Yang, X.; Chung, S. W.; Choi, H.; Heath, J. R. *Angew. Chem. Int. Edit.* 2001, 40, 1721.
(4) Coleman, J.; Dalton, A.; Curran, S.; Rubio, A.; Davey, A.; Drury, A.; McCarthy, B.; Lahr, B.; Ajayan, P.; Roth, S.; Barklie, R.; Blau, W. *Adv. Mater.* 2000, 12, 401.
(5) Li, L. Y.; Li, C. Y.; Ni, C. Y. *J. Am. Chem. Soc.* 2006, 128, 1692
(6) Suri, A.; Chakraborty, A. K.; Coleman, K. S. *Chem. Mater.* 2008, 20, 1705.
(7) Zhang, L.; Tao, T.; Li, C. Z. *Polymer* 2009, 50, 3835.
(8) Vaisman, L.; Wagner, H. D.; Marom, G. *Adv. Colloid Interfac* 2006, 128, 37.
(9) Karousis, N.; Tagmatarchis, N.; Tasis, D. *Chem. Rev.* 2010, 110, 5366.
(10) Bellayer, S.; Gilman, J. W.; Eidelman, N.; Bourbigot, S.; Flambard, X.; Fox, D. M.; De Long, H. C.; Trulove, P. C. *Adv. Funct. Mater.* 2005, 15, 910.
(11) Price, B. K.; Tour, J. M. *J. Am. Chem. Soc.* 2006, 128, 12899.
(12) Hu, H.; Zhao, B.; Hamon, M. A.; Kamaras, K.; Itkis, M. E.; Haddon, R. C. *J. Am. Chem. Soc.* 2003, 125, 14893
(13) Coleman, K. S.; Bailey, S. R.; Fogden, S.; Green, M. L. H. *J. Am. Chem. Soc.* 2003, 125, 8722.
(14) Ge, J. J.; Zhang, D.; Li, Q.; Hou, H. Q.; Graham, M. J.; Dai, L. M.; Harris, F. W.; Cheng, S. Z. D. *J. Am. Chem. Soc.* 2005, 127, 9984.
(15) Blake, R.; Coleman, J. N.; Byrne, M. T.; McCarthy, J. E.; Perova, T. S.; Blau, W. J.; Fonseca, A.; Nagy, J. B.; Gun'ko. Y. K. *J. Mater. Chem.* 2006, 16, 4206.
(16) Li, L. Y; Li, B.; Hood, M. A.; Li, C. Y. *Polymer* 2009, 50, 953.
(17) Li, L. Y.; Li, C. Y.; Ni, C. Y.; Rong, L. X.; Hsiao, B. *Polymer* 2007, 48, 3452
(18) Liu, T. X.; Tong, Y. J.; Zhang, W. D. *Compos. Sci. Technol.* 2007, 67, 406.
(19) Siochi, E. J.; Working, D. C.; Park, C.; Lillehei, P. T.; Rouse, J. H.; Topping, C. C.; Bhattacharyya, A. R.; Kumar, S. *Compos. Part. B-eng.* 2004, 35, 439
(20) Isayev, A. I.; Kumar, R.; Lewis, T. M. *Polymer* 2009, 50, 250.
(21) Plechkova, N. V.; Seddon, K. R. *Chem. Soc. Rev.* 2008, 35, 123.
(22) Rebelo, L. P. N.; Lopes, J. N. C.; Esperanca, J.; Guedes, H. J. R.; Lachwa, J.; Najdanovic-Visak, V.; Visak, Z. P. *Accounts. Chem. Res.* 2007, 40, 1114.
(23) Earle, M. J.; Seddon, K. R. *Pure Appl. Chem.* 2000, 72, 1391
(24) Rogers, R. D.; Seddon. K. R. *Science* 2003, 302, 792.
(25) Price, B. K.; Hudson, J. L.; Tour, J. M. *J. Am. Chem. Soc.* 2005, 12, 14867.
(26) Fukushima, T.; Aida, T. *Chem-eur. J.* 2007, 13, 5048.
(27) Wang, J. Y.; Chu, H. B.; Li, Y. *Acs Nano* 2008, 2, 2540.
(28) Wang, J. Y.; Li, Y. *J. Am. Chem. Soc.* 2009, 131, 5364.
(29) Sekitani, T.; Noguchi, Y.; Hata, K.; Fukushima, T.; Aida, T.; Someya, T. *Science* 2008, 321, 1468.
(30) Lee, J.; Aida, T. *Chem. Commun.* 2011, 47, 6757.
(31) Likozar, B. *Soft Matter* 2011, 7, 970.
(32) Wei, D.; Baral, J. K.; Osterbacka, R.; Ivaska, A. *Nanotechnology* 2008, 19.
(33) Subramaniam, K.; Das, A.; Heinrich, G. *Compos. Sci. Technol.* 2011, 71, 1441.
(34) Terasawa, N.; Takeuchi, I.; Matsumoto, H.; Mukai, K.; Asaka, K. *Sensor Actuat. B-chem* 2011, 156, 539.
(35) Carrion, F. J.; Espejo, C.; Sanes, J.; Bermudez, M. D. *Compos. Sci. Technol.* 2010, 70, 2160.
(36) Pauliukaite, R.; Murnaghan, K. D.; Doherty, A. P.; Brett, C. M. A. *J. Electroanal. Chem.* 2009, 633, 106.
(37) Carrion, F. J.; Sanes, J.; Bermudez, M. D.; Arribas, A. *Tribol. Lett.* 2011, 41, 199.
(38) Scott, M. P.; Brazel, C. S.; Benton, M. G.; Mays, J. W.; Holbrey, J. D.; Rogers, R. D. *Chem. Commun.* 2002, 1370.
(39) Kumar, S.; Li, B.; Caceres, S.; Maguire, R. G.; Zhong, W. H. *Nanotechnology* 2009, 20.
(40) Higgins, B. A.; Brittain, W. J. *Eur. Poly. J.* 2005, 41, 889.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g. 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to figures and the measurement techniques. In addition, the phrase "about 'x' to 'y'" includes "about 'x' to about 'y'". When a range includes "zero" and is modified by "about" (e.g., about one to zero or about zero to one), about zero can include, 0, 0.1, 0.01, or 0.001.

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A polymer nanocomposite, comprising:
    a polymer selected from the group consisting of: polyetherimide (PEI) polymer, polyether sulfone (PES), polyaryletherketone (PAEK), and general engineering plastic such as polycarbonate (PC), polybutylene terephthalate (PBT);
    an ionic liquid; and
    carbon nanotubes.

2. The polymer nanocomposite of claim 1, wherein the polymer is a PEI polymer.

3. The polymer nanocomposite of claim 2, wherein the PEI polymer has the following structure:

4. The polymer nanocomposite of claim 1, wherein the PEI polymer is about 45 to 97.9 weight percent of the polymer nanocomposite, wherein the ionic liquid is about 2 to 50 weight percent of the polymer nanocomposite, and wherein the carbon nanotubes are about 0.1 to 5 weight percent of the polymer nanocomposite.

5. The polymer nanocomposite of claim 1, wherein the ionic liquid s selected from the group consisting of an imidizolium-based cation, a pyridinium-based cation, an ammonium-based cation, a phosphonium-based cation, a thiazolium-based cation, a triazolium-based cation, an oxazolium-based cation, a pyrazolium-based cation, a pyrazinium-based cation, and a combination thereof.

6. The polymer nanocomposite of claim 1, wherein the Ionic quid is selected from the group consisting of 1-neopentyl-3-methylimidazolium, 1-isopropyl-3-methylimidazolium, 1-methylimidazolium, imidazolium, 1,3-dimethylimidazolium, tetramethylammonium, 2-methylimidazolium, 4-methylimidazolium, 1,2-dimethylimidazolium, 1,4-dimethylimidazolium, 1,2,3-trimethylimidazolium, 2,4,5-trimethylimidazolium, 1-trifluoroacetylimidazolium, 1-methylbenzimidazolium, 1,3-dimethylbenzimidazolium, pyridinium, 1,4-methylpyridinium, 2,6-lutidinium, 3,5-lutidinium, pyrazinium, 1-methylpyrazinium, 2-methylpyrazinium, 2,3-dimethylpyrazinium, 2,3,5-trimethylpyrazinium, 2,3,5,6-tetramethylpyrazinium, 1,2,3,5,6-pentamethylpyrazinium, quinoxalinium, pyrimidinium, 4,6-dimethylpyrimidinium, bipyrimidinium, and 1-methylbipyrimidinium, each of which can be substituted.

7. The polymer nanocomposite of claim 1, wherein the carbon nanotube is a multiwalled carbon nanotube.

8. A polymer nanocomposite, comprising: a polymer, an ionic liquid, and carbon nanotubes, and
    wherein the polymer is polyetherimide (PEI) polymer;
    wherein the PEI polymer is about 45 to 97.9 weight percent of the polymer nanocomposite,
    wherein the ionic liquid is about 2 to 50 weight percent of the polymer nanocomposite; and
    wherein the carbon nanotubes are about 0.1 to 5 weight percent of the polymer nanocomposite.

9. A polymer nanocomposite, comprising:
    polyetherimide (PEI) polymer, an ionic liquid, and carbon nanotubes, wherein the PEI polymer has the following structure:

* * * * *